United States Patent
Natsuyama et al.

(10) Patent No.: US 8,399,104 B2
(45) Date of Patent: Mar. 19, 2013

(54) COMPOSITE MOLDED ARTICLE AND PROCESS FOR PRODUCING THE SAME

(75) Inventors: Nobuhiro Natsuyama, Ichihara (JP); Hironobu Shigematsu, Kobe (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 451 days.

(21) Appl. No.: 12/532,113

(22) PCT Filed: Mar. 21, 2008

(86) PCT No.: PCT/JP2008/055998
§ 371 (c)(1),
(2), (4) Date: Sep. 18, 2009

(87) PCT Pub. No.: WO2008/117859
PCT Pub. Date: Oct. 2, 2008

(65) Prior Publication Data
US 2010/0112366 A1    May 6, 2010

(30) Foreign Application Priority Data
Mar. 23, 2007    (JP) ................................. 2007-076409

(51) Int. Cl.
*B32B 27/00*    (2006.01)
*B32B 27/08*    (2006.01)

(52) U.S. Cl. .......................... 428/515; 428/500; 428/519

(58) Field of Classification Search .................. None
See application file for complete search history.

(56) References Cited

U.S. PATENT DOCUMENTS
2006/0188739 A1 * 8/2006 Imai .............................. 428/516

FOREIGN PATENT DOCUMENTS

| | | |
|---|---|---|
| CN | 1774466 A | 5/2006 |
| JP | 59-221347 A | 12/1984 |
| JP | 05-295180 A | 11/1993 |
| JP | 2000-044743 A | 2/2000 |
| JP | 2000-281845 A | 10/2000 |
| JP | 2001-219511 A | 8/2001 |
| JP | 2002-059493 A | 2/2002 |
| JP | 2002-265715 A | 9/2002 |
| JP | 2006-044077 A | 2/2006 |

OTHER PUBLICATIONS

First Office Action issued Jun. 1, 2012 in Chinese Patent Application No. 200880014937.7 to Sumitomo Chemical Co., Ltd. with translation.

* cited by examiner

*Primary Examiner* — Sheeba Ahmed
(74) *Attorney, Agent, or Firm* — Sughrue Mion, PLLC

(57) ABSTRACT

The present invention provides a composite molded article and a method for producing the same. The composite molded article comprises a molded article of an olefin thermoplastic elastomer (A) and a molded article of an olefin thermoplastic elastomer (B) fused to each other, wherein the olefin thermoplastic elastomer molded article (A) contains an olefin thermoplastic elastomer composition (A') having less than 5% by weight of a cyclohexane-soluble(s) and less than 35% of a compression set (JIS K6262, 70° C., 22 hours), and the olefin thermoplastic elastomer molded article (B) contains an olefin thermoplastic elastomer composition (B') obtained by blending 100 parts by weight of an ethylene/α-olefin/non-conjugated diene copolymer rubber (b-1) containing 6 to 15 wt % of a non-conjugated diene unit, with 40 to 150 parts by weight of a mineral oil softener (b-2), 5 to 150 parts by weight of an olefin resin (b-3), and 0.01 to 20 parts by weight of a crosslinking agent (b-4) and subsequent dynamic heat treatment thereof.

5 Claims, No Drawings

COMPOSITE MOLDED ARTICLE AND PROCESS FOR PRODUCING THE SAME

TECHNICAL FIELD

The present invention relates to a composite molded article comprising molded articles of olefin thermoplastic elastomer fused to each other, and a method for producing the composite molded article.

BACKGROUND ART

As a general method for producing a weather strip material having a rod-shaped member and a corner member fused to each other, a production method by so-called insert molding is known in which generally an unvulcanized rubber composition of a terpolymer of an ethylene/propylene/non-conjugated diene is profile-extruded and vulcanized to produce a rod-shaped member, the rod-shaped member is charged into one side or both sides of a mold and then an unvulcanized rubber composition of a terpolymer of an ethylene/propylene/non-conjugated diene is injected into the mold cavity, following vulcanization and molding thereof thereby vulcanizing and fusion-bonding a corner part to the rod-shaped member. This method, however, requires the vulcanization step to be conducted twice, is complicated and requires a long operation time, and improvement is thus strongly demanded from the viewpoints of saving in labor, improvement in productivity, reduction in weight, and the like. Accordingly, thermoplastic elastomer compositions, which do not require vulcanization, have been increasingly substituting in recent years for rubber compositions in order to simplify the molding process and reduce the operation time.

However, when thermoplastic elastomer compositions are used in the method described above, the resulting composite molded article is sometimes inferior in fusion strength between a rod-shaped member and a corner member. JP-A 59-221347 describes that an olefin thermoplastic elastomer composition compounded with crystalline poly-1-butene is used as an olefin thermoplastic elastomer composition with an improved fusion-bonding property, but its effect is not sufficient.

DISCLOSURE OF THE INVENTION

Under these circumstances, a problem to be solved by the present invention is to provide a composite molded article comprised of molded articles of olefinic thermoplastic elastomer fused to each other with sufficient strength and a method for producing the same.

That is, the present invention provides a composite molded article comprising a molded article of an olefinic thermoplastic elastomer (A) and a molded article of an olefinic thermoplastic elastomer (B) fused to each other,
wherein
the molded article of olefinic thermoplastic elastomer (A) contains an olefinic thermoplastic elastomer composition (A') having less than 5% by weight of a cyclohexane-soluble (s) and less than 35% of a compression set (JIS K6262, 70° C., 22 hours), and
the molded article of olefinic thermoplastic elastomer (B) contains an olefinic thermoplastic elastomer composition (B') obtained by blending 100 parts by weight of an ethylene/α-olefinic/non-conjugated diene copolymer rubber (b-1) containing 6 to 15 wt % of a non-conjugated diene unit, with 40 to 150 parts by weight of a mineral oil softener (b-2), 5 to 150 parts by weight of an olefin resin (b-3), and 0.01 to 20 parts by weight of a crosslinking agent (b-4) and subsequent dynamic heat treatment thereof.

The present invention also provides a method for producing the composite molded article, which includes
  charging the olefinic thermoplastic elastomer molded article (A) into a mold, then
  injecting the olefinic thermoplastic elastomer composition (B') into the mold, and
  fusing the olefinic thermoplastic elastomer composition (B') to the molded article of olefinic thermoplastic elastomer (A).

BEST MODE FOR CARRYING OUT THE INVENTION

The composite molded article of the present invention is a composite molded article comprised of molded article of an olefinic thermoplastic elastomer (A) and molded article of an olefinic thermoplastic elastomer (B) fused to each other, wherein the molded article of olefinic thermoplastic elastomer (A) contains an olefinic thermoplastic elastomer composition (A') having less than 5% by weight of a cyclohexane-soluble (s) and less than 35% of a compression set (JIS K6262, 70° C., 22 hours), and the olefinic thermoplastic elastomer molded article (B) contains an olefinic thermoplastic elastomer composition (B') obtained by blending 100 parts by weight of an ethylene/α-olefine/non-conjugated diene copolymer rubber (b-1) containing 6 to 15 wt % of a non-conjugated diene unit, with 40 to 150 parts by weight of a mineral oil softener (b-2), 5 to 150 parts by weight of an olefin resin (b-3), and 0.01 to 20 parts by weight of a cross-linking agent (b-4) and subsequent dynamic heat treatment thereof.

The molded article of the olefinic thermoplastic elastomer (A) in the present invention is a molded article produced by molding the olefinic thermoplastic elastomer composition (A') having less than 5% by weight of a cyclohexane-soluble (s) and less than 35% of a compression set (JIS K6262, 70° C., 22 hours). The olefinic thermoplastic elastomer composition (A') is produced by heat-treating, under kneading, an olefin resin and an ethylene/α-olefin copolymer rubber, with a crosslinking agent and if necessary a crosslinking assistant, in a kneader or the like, and has a structure wherein the ethylene/α-olefin copolymer rubber has formed particles in the olefin resin.

The olefin resin is a resin obtained by polymerizing ethylene and/or α-olefin and examples thereof include an ethylene resin containing at least 70% by weight of an ethylene unit and a propylene resin containing at least 50% by weight of a propylene unit. The olefin resin is preferably a propylene homopolymer, a propylene/ethylene copolymer, or a propylene/1-butene copolymer.

Examples of the steric structure of the propylene resin include an isotactic structure, a syndiotactic structure, and a mixed structure of the two structures. Preferably, the principal structure is the isotactic structure.

The melt flow rate of the propylene resin (measured under a load of 21.18 N at a temperature of 230° C. in accordance with JIS K6758) is preferably 0.1 to 300 g/10 min., more preferably 0.5 to 200 g/10 min.

The propylene resin can be produced by a known polymerization method using a polymerization catalyst such as Ziegler-Natta catalyst or metallocene catalysts. Examples of the polymerization method include solution polymerization, bulk polymerization, slurry polymerization and gas phase polymerization, and a combination of two or more of them may be used.

The ethylene-α-olefin copolymer rubber is a copolymer having an ethylene unit and an α-olefin unit and having an A hardness (in accordance with JIS K-6253) of 85 or less. In the present invention, terms such as "ethylene unit" refer hereinafter to a constituent unit that is derived from a monomer and is present in a rubber or a resin obtained by polymerizing a monomer.

The α-olefin is preferably an α-olefin having 3 to 20 carbon atoms, and examples thereof include propylene, 1-butene, 2-methyl propylene, 1-pentene, 3-methyl-1-butene, 1-hexene, 4-methyl-1-pentene and 1-octene, as well as a combination of two or more thereof. From the viewpoint of availability, propylene or 1-butene is preferable and propylene is more preferable.

The ethylene/α-olefin copolymer rubber may have other monomer units in addition to the ethylene unit and α-olefin unit. Examples of the monomers that form such other monomer units include conjugated dienes having 4 to 8 carbon atoms, such as 1,3-butadiene, 2-methyl-1,3-butadiene (isoprene), 1,3-pentadiene and 2,3-dimethyl-1,3-butadiene; non-conjugated dienes having 5 to 15 carbon atoms, such as dicyclopentadiene, 5-ethylidene-2-norbornene, 1,4-hexadiene, 1,5-dicyclooctadiene, 7-methyl-1,6-octadiene and 5-vinyl-2-norbornene; vinyl ester compounds such as vinyl acetate; unsaturated carboxylates such as methyl acrylate, ethyl acrylate, butyl acrylate, methyl methacrylate and ethyl methacrylate; and unsaturated carboxylic acids such as acrylic acid and methacrylic acid, and one of them may be singly used, or two or more of them may be used together. From the viewpoint of availability, 5-ethylidene-2-norbornene or dicyclopentadiene is preferably used.

In the ethylene/α-olefin copolymer rubber, the content of the ethylene unit is usually 30 to 85% by weight, preferably 40 to 80% by weight, the content of the α-olefin unit having 3 to 10 carbon atoms is usually 5 to 70% by weight, preferably 15 to 60% by weight, and the content of other monomer units than the ethylene unit and α-olefin unit is usually 0 to 30% by weight, preferably 0 to 20% by weight, provided that the total content of these units is 100% by weight.

Examples of the ethylene/α-olefin copolymer rubber include an ethylene/propylene copolymer rubber, an ethylene/1-butene copolymer rubber, an ethylene/1-hexene copolymer rubber, an ethylene/1-octene copolymer rubber, an ethylene/propylene/1-butene copolymer rubber, an ethylene/propylene/1-hexene copolymer rubber, an ethylene/propylene/1-octene copolymer rubber, an ethylene/propylene/5-ethylidene-2-norbornene copolymer rubber, an ethylene/propylene/dicyclopentadiene copolymer rubber, an ethylene/propylene/1,4-hexadiene copolymer rubber, and an ethylene/propylene/5-vinyl-2-norbornene copolymer rubber. These copolymer rubbers may be used singly or in combination of two or more thereof. In particular, the copolymer rubber is preferably an ethylene/propylene copolymer rubber or an ethylene/propylene-5-ethylidene-2-norbornene copolymer rubber, more preferably an ethylene/propylene copolymer rubber or an ethylene/propylene-5-ethylidene-2-norbornene copolymer rubber having an ethylene unit content of 40 to 80% by weight, a propylene unit content of 15 to 60% by weight and a 5-ethylidene-2-norbornene unit content of 0 to 20% by weight.

The Mooney viscosity ($ML_{1+4}$ 100° C.) of the ethylene/α-olefin copolymer rubber is preferably 10 to 350, more preferably 30 to 300. An olefin thermoplastic elastomer obtained by using the ethylene/α-olefin copolymer rubber having a Mooney viscosity in the above range can, upon molding, give a molded article superior in mechanical strength and extremely excellent in outward appearance. The Mooney viscosity ($ML_{1+4}$ 100° C.) is measured in accordance with JIS K6300.

From the viewpoint of improvement in the mechanical strength of the molded article, the intrinsic viscosity of the ethylene/α-olefin copolymer rubber, as determined in tetralin at 135° C., is preferably not less than 0.5 dl/g, more preferably not less than 1 dl/g. From the viewpoint of improvement in the appearance of the molded article, the intrinsic viscosity of the ethylene/α-olefin copolymer rubber is preferably not more than 8 dl/g, more preferably not more than 6 dl/g.

The ethylene/α-olefin copolymer rubber may be produced by polymerization according to a known method. Examples of the polymerization method include a polymerization method using a polymerization catalyst such as Ziegler-Natta catalyst or metallocene catalysts in an inert solvent such as hexane, heptane, toluene or xylene.

Examples of the crosslinking agent include materials described later, such as an organic peroxide, a phenol resin, sulfur, a sulfur-containing compound, p-quinone, a derivative of p-quinonedioxime, a bismaleimide compound, an epoxy compound, a silane compound and an amino resin, among which the phenol resin is preferable.

Examples of the phenol resin for use as the crosslinking agent include a compound used conventionally as a crosslinking agent for rubbers, which is represented by the following formula (see U.S. Pat. Nos. 3,287,440 and 3,709,840):

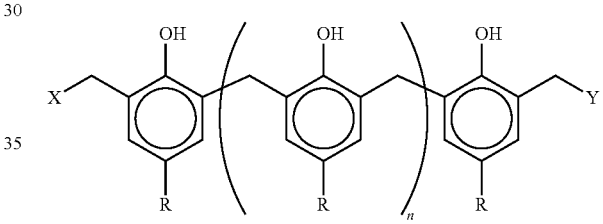

wherein n is an integer of 0 to 10; X and Y independently represent a hydroxyl group, an alkyl halide group or a halogen atom; and R represents a saturated hydrocarbon group having 1 to 15 carbon atoms. This compound can be produced by condensation polymerization of substituted phenol and aldehyde in the presence of an alkali catalyst.

Examples of the phenol resin include alkyl phenol formaldehyde and brominated alkyl phenol formaldehyde.

The phenol resin when used as the crosslinking agent may be combined with a crosslinking accelerator to regulate the speed of the crosslinking reaction. Examples of the crosslinking accelerator include metallic halides such as stannous chloride and stannic chloride, as well as organic halides such as chlorinated polypropylene, butyl bromide rubber and chloroprene rubber.

The phenol resin is used preferably in combination with a dispersant such as a metal oxide (for example, zinc oxide) or stearic acid.

The heat treatment of the olefin resin and the ethylene/α-olefin copolymer rubber in the presence of the crosslinking agent can be carried out by kneading in a molten state with a known closed-type kneading machine such as a Banbury mixer or with an extruder, or with a known melt-kneading machine such as an open roll. In melt kneading, the temperature is usually 150 to 250° C. and the time is usually 1 to 30 minutes.

When the olefin resin and the ethylene/α-olefin copolymer rubber are heat-treated in the presence of the crosslinking agent to produce the olefin thermoplastic elastomer composition (A'), additives including a softener such as process oil, a plasticizer, a low-molecular-weight polymer, a pigment and a filler may, as necessary, be used in combination with the olefin resin and the ethylene/α-olefin copolymer rubber.

The cyclohexane-soluble(s) in the olefin thermoplastic elastomer composition (A') is less than 5% by weight, preferably less than 3% by weight. To reduce the cyclohexane-soluble(s), the crosslinking agent is used preferably in a larger amount. It is also effective to use, as the starting material, an ethylene/α-olefin copolymer rubber containing a large amount of an ethylene unit.

The content of cyclohexane-soluble(s) refers to the percentage by weight of cyclohexane-soluble(s) derived from the starting material ethylene/α-olefin copolymer rubber in the olefin thermoplastic elastomer composition (A'), assuming that the weight of the starting material ethylene/α-olefin copolymer rubber used in the production of the olefin thermoplastic elastomer composition (A') is 100% by weight. This cyclohexane-soluble(s) can be determined in the following manner. About 1 g of the olefin thermoplastic elastomer composition (A') is dipped in 100 mL cyclohexane at 23° C. for 48 hours, and then the weight of its dry residue is measured. When cyclohexane-insoluble components (for example, a filler) are contained in other components than the ethylene/α-olefin copolymer rubber in the olefin thermoplastic elastomer composition (A'), the weight of the dry residue is corrected by subtracting the weight of the cyclohexane-insoluble components from the weight of the dry residue. From both of the weight of the olefin thermoplastic elastomer composition (A') dipped in cyclohexane and the starting material composition of the olefin thermoplastic elastomer composition (A'), the weight of the olefin thermoplastic elastomer composition (A') per unit weight of the olefin thermoplastic elastomer composition (A') dipped in cyclohexane is determined as an initial weight. The difference between the initial weight and the weight of the dry residue (or a corrected weight of the dry residue when correction is necessary) is determined as the weight of the soluble(s), and the ratio (wt %) of the weight of the soluble(s) to the initial weight is calculated as the cyclohexane-soluble (s) (wt %).

The compression set of the olefin thermoplastic elastomer composition (A') is less than 35%. The compression set is determined by injection-molding the olefin thermoplastic elastomer composition (A') under the condition of 200 to 250° C. to produce a sheet of 2 mm in thickness, punching out test specimens each having a diameter of 29 mm from the sheet, placing 6 test specimens one upon another, and measuring the compression set of the sheet under the conditions of 25% compression, 70° C. and 22 hours in accordance with JIS K6262. To reduce the compression set, the crosslinking agent is used preferably in a larger amount. In addition, a phenol resin is preferably used as the crosslinking agent. It is also effective to use, as the starting material, an ethylene/α-olefin copolymer rubber containing a large amount of an ethylene unit and a diene unit.

The olefin thermoplastic elastomer molded article (A) is obtained by molding the olefin thermoplastic elastomer composition (A') by a known molding method such as extrusion molding, injection molding, or compression molding.

The olefin thermoplastic elastomer molded article (B) to be fused to the olefin thermoplastic elastomer molded article (A) contains an olefin thermoplastic elastomer composition (B') obtained by blending 100 parts by weight of an ethylene/α-olefin/nonconjugated diene copolymer rubber (b-1) containing 6 to 15 wt % of a non-conjugated diene unit, with 40 to 150 parts by weight of a mineral oil softener (b-2), 5 to 150 parts by weight of an olefin resin (b-3), and 0.01 to 20 parts by weight of a crosslinking agent (b-4) and subsequent dynamic heat treatment thereof.

The ethylene/α-olefin/nonconjugated diene copolymer rubber (b-1) contains 6 to 15 wt % of a non-conjugated diene unit. The ethylene/α-olefin/non-conjugated diene copolymer rubber (b-1) in the present invention is an ethylene/α-olefin/non-conjugated diene copolymer rubber having an A hardness of 85 or less as determined in accordance with JIS K-6253.

The α-olefin is preferably an α-olefin having 3 to 20 carbon atoms, and examples of the α-olefin include propylene, 1-butene, 2-methylpropylene, 1-pentene, 3-methyl-1-butene, 1-hexene, 4-methyl-1-pentene, and 1-octene, as well as a combination of two or more thereof. Among them, propylene or 1-butene is preferable, and propylene is more preferable, from the viewpoint of availability.

Examples of the non-conjugated diene include linear non-conjugated dienes such as 1,4-hexadiene, 1,6-octadiene, 2-methyl-1,5-hexadiene, 6-methyl-1,5-heptadiene, and 7-methyl-1,6-octadiene; cyclic non-conjugated dienes such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene, and 6-chloromethyl-5-isopropenyl-2-norbornene; and trienes such as 2,3-diisopropylidene-5-norbornene, 2-ethylidene-3-isopropylidene-5-norbornene, 2-propenyl-2,2-norbornadiene, and 4-ethylidene-8-methyl-1,7-nanodiene. Among them, 5-ethylidene-2-norbornene or dicyclopentadiene is preferable.

When the total amount of the ethylene unit, the α-olefin unit having 3 to 20 carbon atoms, and the non-conjugated diene unit contained in the ethylene/α-olefin/nonconjugated diene copolymer rubber (b-1) is 100% by weight, the amount of the ethylene unit contained in the ethylene/α-olefin/non-conjugated diene copolymer rubber (b-1) is usually 30 to 80% by weight, preferably 40 to 80% by weight, and the amount of the α-olefin unit having 3 to 20 carbon atoms is usually 5 to 50% by weight, preferably 15 to 60% by weight. The amount of the nonconjugated diene unit contained in the ethylene/α-olefin/non-conjugated diene copolymer rubber (b-1) is 6 to 15% by weight, preferably 8 to 12% by weight (provided that the total amount of these 3 monomer units is 100% by weight). Specific examples of the ethylene/α-olefin/nonconjugated diene copolymer rubber (b-1) include an ethylene/propylene/5-ethylidene-2-norbornene copolymer, an ethylene/propylene/dicyclopentadiene copolymer, an ethylene/propylene/1,4-hexadiene copolymer, an ethylene/propylene/5-vinyl-2-norbornene copolymer, and a combination of two or more thereof. Among them, the ethylene/propylene/5-ethylidene-2-norbornene copolymer having an ethylene unit content of 40 to 80% by weight, a propylene unit content of 15 to 55% by weight and a 5-ethylidene-2-norbornene unit content of 8 to 12% by weight is preferable.

The amounts of the ethylene unit, the α-olefin unit having 3 to 20 carbon atoms, and the nonconjugated diene unit contained in the ethylene/α-olefin/nonconjugated diene copolymer rubber can be determined by infrared spectroscopy (IR method). Specifically, when the ethylene/propylene/5-ethylidene-2-norbornene copolymer rubber is measured, the copolymer rubber is molded into a film of about 0.5 mm in thickness and then measured for a peak (absorption peak at 1688 $cm^{-1}$) derived from 5-ethylidene-2-norbornene of the film with an infrared spectrophotometer, and from the peak, the amount of the 5-ethylidene-2-norbornene unit in the copolymer rubber is calculated. Then, the copolymer rubber is molded into a film of about 0.1 mm in thickness, then an infrared absorption spectrum of the film is measured with an infrared spectrophotometer, the percentages of the ethylene unit and propylene unit are determined according to a method described in a literature (Takayama, Usami et al.: Characterization of Polyethylene by Infrared Absorption Spectrum, or Mc Rae, M. A., Madam S, W. F. et al.: Die Makromolekulare Chemie, 177, 461 (1976)), and from the percentages of the ethylene unit and propylene unit and the amount of the 5-ethylidene-2-norbornene unit, the amounts of the ethylene unit and propylene unit are calculated.

The ethylene/α-olefin/nonconjugated diene copolymer rubber (b-1) can be produced by polymerization according to a known method. Examples of the polymerization method include a polymerization method using a polymerization catalyst such as a Ziegler-Natta catalyst or a metallocene catalyst in an inert solvent such as hexane, heptane, toluene or xylene.

The Mooney viscosity ($ML_{1+4}$ 100° C.) of the ethylene/α-olefin/nonconjugated diene copolymer rubber (b-1) is preferably 10 to 350, more preferably 30 to 300. An olefin thermoplastic elastomer composition obtained by using the ethylene/α-olefin/nonconjugated diene copolymer rubber having a Mooney viscosity in the above range can, upon molding, give a molded article superior in mechanical strength and extremely excellent in outward appearance. The Mooney viscosity ($ML_{1+4}$ 100° C.) is measured in accordance with JIS K6300.

Examples of the mineral oil softener (b-2) in the present invention include petroleum high-boiling fractions (average molecular weight, 300 to 1500; flow point, 0° C. or less) such as aromatic mineral oil, naphthenic mineral oil, and paraffinic mineral oil. Among them, paraffinic mineral oil is preferable.

The mineral oil softener (b-2) is added preferably as extended oil to the ethylene/α-olefin/nonconjugated diene copolymer rubber (b-1). The method of addition may be any known method, including for example (1) a method in which the two are mechanically kneaded by using a kneader such as a roll or a Banbury mixer and (2) a method in which Component (C) is added to a solution of Component (A) produced in a solution form and then the solvent is removed therefrom by a technique such as steam stripping.

The olefin resin (b-3) in the present invention is a resin obtained by polymerizing ethylene and/or α-olefin and examples thereof include an ethylene resin containing at least 70% by weight of an ethylene unit and a propylene resin containing at least 50% by weight of a propylene unit.

Examples of the propylene resin for use as the olefin resin (b-3) in the present invention include those polymers containing 50 to 100% by weight, preferably 80 to 100% by weight, of a propylene unit, such as propylene homopolymers, or random or block copolymers of propylene with ethylene and/or α-olefin having 4 to 10 carbon atoms (for example, 1-butene, 1-hexene, 1-pentene, 1-octene and 4-methyl-1-pentene). Examples of the copolymers include an ethylene/propylene copolymer, a propylene/1-butene copolymer, a propylene/1-hexene copolymer, a propylene/1-octene copolymer, a propylene/ethylene/1-butene copolymer, and an ethylene/propylene/1-hexene copolymer. As the olefin resin (b-3), a propylene homopolymer, an ethylene/propylene copolymer or a propylene/1-butene copolymer is preferably used.

The block copolymer when produced using propylene and ethylene refers to a polymer produced by a production method including the following steps:

(1) a step of homopolymerizing propylene to form polypropylene, and
(2) a step of copolymerizing propylene with ethylene in the presence of the polypropylene, or (1) a step of homopolymerizing propylene to form polypropylene, and
(2) a step of adding and polymerizing ethylene in the presence of the polypropylene while removing unreacted propylene monomers.

In the former case, the obtained polymer is a mixture consisting essentially of the polypropylene formed in the step (1) and the propylene/ethylene copolymer formed in the step (2).

When the olefin resin (b-3) used in the present invention is a propylene resin, the propylene resin has a melt flow rate of preferably 0.1 to 300 g/10 min., more preferably 0.5 to 200 g/10 min, as determined under a load of 21.18 N at a temperature of 230° C. in accordance with JIS K6758.

Examples of the ethylene resin used as the olefin resin (b-3) in the present invention include those polymers containing 70 to 100% by weight of an ethylene unit, such as ethylene homopolymers, or copolymers of ethylene with α-olefin having 3 to 10 carbon atoms (for example, propylene, 1-butene, 1-pentene, 4-methyl-1-pentene, and 1-hexene) and/or a monomer having a polar group and a carbon-carbon double bond (for example, vinyl acetate, acrylate, or methacrylate). Preferable examples of the ethylene resin include high density polyethylene, low density polyethylene, an ethylene-propylene copolymer, an ethylene/1-butene copolymer, an ethylene/1-pentene copolymer, an ethylene/4-methyl-1-pentene copolymer and an ethylene/1-hexene copolymer.

When the olefin resin (b-3) used in the present invention is an ethylene resin, the ethylene resin has a melt flow rate of preferably 0.01 to 300 g/10 min., more preferably 0.1 to 200 g/10 min., as determined under a load of 21.18 N at a temperature of 190° C. in accordance with JIS K6760.

The olefin resin (b-3) used in the present invention can be obtained by polymerization according to a known method. The polymerization method can be exemplified by polymerization methods using a polymerization catalyst such as a Ziegler-Natta catalyst or a metallocene catalyst, wherein (1) polymerization is performed in an inert solvent such as hexane, heptane, toluene or xylene, (2) liquid monomers are polymerized (bulk polymerization), (3) gaseous monomers are polymerized (gas phase polymerization), or (4) the abovementioned (1) to (3) are combined. The steric structure of the olefin resin (b-3) is not particularly limited. Examples of the steric structure include an isotactic structure, a syndiotactic structure, and a mixture of the two structures. In particular, the olefin resin (b-3) is preferably a propylene resin having an isotactic structure as the principal structure.

The crosslinking agent (b-4) for use in the present invention may be any crosslinking agent used conventionally in crosslinking a rubber, and examples of such a crosslinking agent include an organic peroxide, a phenol resin, sulfur, a sulfur-containing compound, p-quinone, a derivative of p-quinonedioxime, a bismaleimide compound, an epoxy compound, a silane compound and an amino resin, among which an organic peroxide is preferable.

Examples of the organic peroxide include dicumyl peroxide, di-tert-butyl peroxide, 2,5-dimethyl-2,5-di(tert-butyl peroxy) hexane, 2,5-dimethyl-di(tert-butyl peroxy) hexyne-3,1,3-bis(tert-butyl peroxyisopropyl) benzene, 1,1-bis(tert-butyl peroxy)-3,3,5-trimethylcyclohexane, n-butyl-4,4-bis (tert-butylperoxy) valerate, benzoyl peroxide, p-chlorobenzoyl peroxide, 2,4-dichlorobenzoyl peroxide, tert-butyl peroxy benzoate, tert-butyl peroxyisopropyl carbonate, diacetyl peroxide, lauroyl peroxide and tert-butyl peroxide. The organic peroxide is preferably 2,5-dimethyl-2,5-di(tert-butyl peroxy)-hexyne-3,2,5-dimethyl-2,5-di(tert-butyl peroxy) hexane or 1,3-bis(tert-butyl peroxy isopropyl)

benzene, among which 2,5-dimethyl-2,5-di(tert-butyl peroxy)-hexyne-3 having a high decomposition temperature is particularly preferable.

The organic peroxide used in the present invention may be liquid, powder, pellets or the like. To improve dispersibility, the organic peroxide is preferably diluted, before use, with a diluent inactive to the crosslinking reaction, such as an inorganic filler, mineral oil or a solvent. The organic peroxide is added more preferably in the form of a liquid. Among diluents, paraffinic oil is a preferable diluent in consideration of handleability and its influence on products.

In order to proceed the crosslinking reaction homogeneously and gently, a crosslinking assistant may be used in combination with the organic peroxide. As the crosslinking assistant, a multifunctional compound based on sulfur, methacrylate or maleimide can be incorporated. Examples of the crosslinking assistant include sulfur, p-quinonedioxime, p,p'-dibenzoyl quinonedioxime, ethylene glycol dimethacrylate, diethylene glycol dimethacrylate, triethylene glycol dimethacrylate, tetraethylene glycol dimethacrylate, polyethylene glycol dimethacrylate, trimethylol propane trimethacrylate, diallyl phthalate, tetraallyl oxyethane, triallyl isocyanurate, N,N'-m-phenylenebismaleimide, maleic anhydride, divinyl benzene, zinc diacrylate and zinc dimethacrylate. In particular, N,N'-m-phenylene bismaleimide, p,p'-dibenzoyl quinonedioxime, divinyl benzene, trimethyrol propane trimethacrylate or triallyl isocyanurate is preferred. N,N'-m-phenylene bismaleimide may be singly used as the crosslinking agent.

Examples of the phenol resin used as the crosslinking agent (b-4) include a compound used conventionally as a crosslinking agent for a rubber, which is represented by the following formula (see U.S. Pat. Nos. 3,287,440 and 3,709,840):

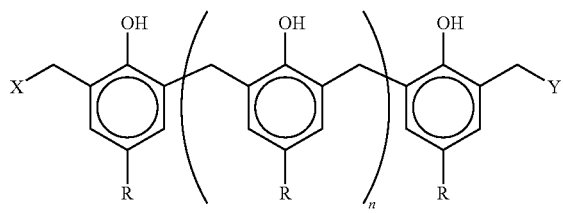

wherein n is an integer of 0 to 10; X and Y independently represent a hydroxyl group, an alkyl halide group or a halogen atom; and R represents a saturated hydrocarbon group having 1 to 15 carbon atoms. This compound can be produced by condensation polymerization of substituted phenol and aldehyde in the presence of an alkali catalyst.

Examples of the phenol resin include alkylphenol-formaldehyde and brominated alkylphenol-formaldehyde.

The phenol resin when used as the crosslinking agent may be combined with a crosslinking accelerator to regulate the speed of the crosslinking reaction. Examples of the crosslinking accelerator include metallic halides such as stannous chloride and stannic chloride, as well as organic halides such as chlorinated polypropylene, butyl bromide rubber and chloroprene rubber.

The phenol resin is preferably used in combination with a dispersant such as a metal oxide (for example, zinc oxide) or stearic acid.

The olefin thermoplastic elastomer composition (B') in the present invention may contain components other than the ethylene/α-olefin/non-conjugated diene copolymer rubber (b-1), the mineral oil softener (b-2), the olefin resin (b-3) and the crosslinking agent (b-4); for example, the composition (B') may contain inorganic fillers such as talc and calcium carbonate; additives such as a flame retardant, a plasticizer, an antistatic agent, a heat/light stabilizer, an anti-aging agent and a release agent; and pigments. These materials may be added when the ethylene/α-olefin/non-conjugated diene copolymer rubber (b-1), the mineral oil softener (b-2), the olefin resin (b-3) and the crosslinking agent (b-4) are subjected to dynamic heat treatment.

The terms "dynamic heat treatment" refers to kneading in a molten state.

The dynamic heat treatment in the present invention can be carried out with a known closed-type kneading machine such as a Banbury mixer, an extruder, or known melt-kneading machine such as an open roll. In melt kneading, the temperature is usually 150 to 250° C. and the time is usually 1 to 30 minutes.

The composite molded article of the present invention is produced by fusing the molded article of olefin thermoplastic elastomer (A) and the molded article of olefin thermoplastic elastomer (B) consisting of the olefin thermoplastic elastomer composition (B') to each other. Examples of the method for producing such composite molded article include a method which includes charging the previously produced molded article of olefin thermoplastic elastomer (A) into a mold, then injecting an olefin thermoplastic elastomer composition (B') into the mold, and fusing the olefin thermoplastic elastomer composition (B') to the molded article of olefin thermoplastic elastomer (A).

The shapes of the molded article of olefin thermoplastic elastomer (A) and the molded article of olefin thermoplastic elastomer (B), which constitute the composite molded article of the present invention, and the shape of the composite molded article, are not particularly limited, but the composite molded article is suitably used for an automobile interior or exterior material. An example of the automobile interior or exterior material is a door trim having a skin member layer of the molded article of olefin thermoplastic elastomer (B) fused to a base material layer of the molded article of olefin thermoplastic elastomer (A).

The composite molded article of the present invention is preferable as a weather strip material. Particularly, the composite molded article of the present invention, which includes a rod-shaped member made of the molded article of olefin thermoplastic elastomer (A) and a corner member made of the molded article of olefin thermoplastic elastomer (B) fused to each other, is excellent in fusion strength and free of stickiness, and is thus preferable as a weather strip material.

Examples of the method for producing the weather strip material according to the present invention include a method of so-called insert molding in which the molded article of thermoplastic elastomer (A) previously formed by extrusion molding into a rod shape and then cutting the rod into a predetermined length is charged into a mold from different directions, and then the olefin thermoplastic elastomer composition (B') is injected into the mold with an injection molding machine and fused to the molded article of thermoplastic elastomer (A).

As the injection molding machine, a screw or plunger injection unit is usually used. The injection rate is usually 1 to 2000 cm$^3$/sec., preferably 10 to 1000 cm$^3$/sec., in terms of shot rate. The temperature in introducing the thermoplastic elastomer (B') into a mold is preferably 150 to 300° C. At this time, the mold may be used under heating or may be used at room temperature without heating. The temperature of the mold is preferably in the range of 30 to 80° C. The internal surface of the mold may be made highly smooth or formed to provide a letter, a design or the like depending on the intended purpose and use of the composite molded article. When the thermoplastic elastomer (B') is introduced into the mold, the molded article of thermoplastic elastomer (A) may be previously heated or may remain at room temperature. Both of the mold and the molded article of thermoplastic elastomer (A) are preferably maintained in a low-temperature state, particularly preferably at a temperature in the range of 20 to 60° C.

EXAMPLES

Hereinafter, the present invention will be described in more detail with reference to the examples, but the present invention is not limited to these examples.

Example 1

Production of Olefin Thermoplastic Elastomer Composition (B')

200 parts by weight of an oil extended ethylene/propylene/5-ethylidene-2-norbornene copolymer rubber (a mixture of 100 parts by weight of a copolymer rubber (EPDM-1; Mooney viscosity (JIS K6300, $ML_{1-4}$ 100° C.)=53, the content of an ethylene unit (IR method)=62.0 wt %, the content of a propylene unit (IR method)=28.1 wt %, the content of a 5-ethylidene-2-norbornene unit (IR method)=9.9 wt %) and 100 parts by weight of an extended oil (trade name: PW-380, manufactured by Idemitsu Kosan Co., Ltd.)) as a rubber component, 77.8 parts by weight of a propylene homopolymer (PP-1; melt flow rate (JIS K6758, 230° C., 21.18 N)=0.7 g/10 min.) as an olefin resin, 0.28 parts by weight of a phenol-based antioxidant (trade name: Irganox 1010, manufactured by Ciba Specialty Chemicals) as an antioxidant, 0.56 parts by weight of a diazo-based weathering stabilizer (trade name: Sumisorb 300, manufactured by Sumitomo Chemical Co., Ltd.,) as a weathering stabilizer, 0.56 parts by weight of a HALS-based weathering stabilizer (trade name: Tinuvin 622, manufactured by Ciba Specialty Chemicals), 8.9 parts by weight of an organic peroxide (10% dilution of 2,5-dimethyl-2,5-di(t-butylperoxy) hexane (trade name: APO-10DL, manufactured by Kayaku Akzo Corporation) in paraffinic oil (trade name: PW-100, manufactured by Idemitsu Kosan Co., Ltd.)), and 0.83 parts by weight of a crosslinking assistant (trade name: High Cross M-P, manufactured by Seiko Chemical Co., Ltd.) were extruded via a twin-screw extruder at 200±10° C. (that is, under dynamic heating), to give an olefin thermoplastic elastomer composition (B').

Production of Composite Molded Article

A plate molded article of 9 cm×3 cm×thickness 2 mm (trade name: 121-73W175, manufactured by AES Co., Ltd.) was used as the olefin thermoplastic elastomer molded article (A). The content of cyclohexane-soluble(s) of the molded article was less than 3%, and the compression set thereof was 32%.

The molded article of olefin thermoplastic elastomer (A) was charged into a mold of a 100-ton injection molding machine, and the olefin thermoplastic elastomer composition (B') was injected into the mold set at a mold temperature of 50° C. at a cylinder temperature of 250° C., followed by insert molding thereby giving a composite molded article in which the molded article of olefin thermoplastic elastomer (A) and the molded article of olefin thermoplastic elastomer (B) were fused to each other. The composite molded article was punched out with JIS No. 3 dumbbell and pulled at a pulling rate of 200 mm/min. for evaluation of its adhesion strength.

The composite molded article was placed in an oven at 80° C. for 168 hours and observed for its interfacial stickiness. The results are shown in Table 1.

Example 2

Evaluation was conducted in the same manner as in Example 1 except that 200 parts by weight of an oil extended ethylene/propylene/5-ethylidene-2-norbornene copolymer rubber (EPDM-1) was used as a rubber component and 56.4 parts by weight of a propylene homopolymer (PP-1) was used as an olefin resin. The results are shown in Table 1.

Comparative Example 1

Evaluation was conducted in the same manner as in Example 1 except that an oil extended ethylene/propylene/5-ethylidene-2-norbornene copolymer rubber (a mixture of 100 parts by weight of a copolymer rubber (EPDM-2; Mooney viscosity (JIS K6300, $ML_{1+4}$ 100° C.)=53, the content of an ethylene unit (IR method)=65.2 wt %, the content of a propylene unit (IR method)=29.5 wt %, the content of a 5-ethylidene-2-norbornene unit (IR method)=5.3 wt %) and 100 parts by weight of an extended oil (trade name: PW-380, manufactured by Idemitsu Kosan Co., Ltd.)) was used as a rubber component. The results are shown in Table 1.

Comparative Example 2

Evaluation was conducted in the same manner as in Example 1 except that 200 parts by weight of the oil extended ethylene/propylene/5-ethylidene-2-norbornene copolymer rubber (EPDM-2) was used as a rubber component and 56.4 parts by weight of the propylene homopolymer (PP-1) was used as an olefin resin. The results are shown in Table 1.

TABLE 1

|  | Example 1 | Example 2 | Comparative Example 1 | Comparative Example 2 |
|---|---|---|---|---|
| Olefin thermoplastic elastomer molded article (A) | 121-73W175 | 121-73W175 | 121-73W175 | 121-73W175 |
| Formulation of polymer of olefin thermoplastic elastomer composition (B') | | | | |
| PP-1 (parts by weight) | 77.8 | 56.4 | 77.8 | 56.4 |
| EPDM-1 (parts by weight) | 200 | 200 | — | — |
| EPDM-2 (parts by weight) | — | — | 200 | 200 |
| Adhesion strength (MPa) | 4.4 | 4.4 | 4.0 | 3.8 |
| State of adhesive interface | Not sticky | Not sticky | Sticky | Sticky |

Example 3

Evaluation was conducted in the same manner as in Example 1 except that 200 parts by weight of the oil extended ethylene/propylene/5-ethylidene-2-norbornene copolymer rubber (EPDM-1) was used as a rubber component and 66.7 parts by weight of the propylene homopolymer (PP-1) was used as an olefin resin. The results are shown in Table 2.

Comparative Example 3

Production of Olefin Thermoplastic Elastomer Molded Article (A-2)

200 parts by weight of the oil extended ethylene/propylene/5-ethylidene-2-norbornene copolymer rubber (EPDM-2) as a rubber component, 56.4 parts by weight of the propylene homopolymer (PP-1) as propylene, 0.25 parts by weight of a phenol-based antioxidant (trade name: Irganox 1010, manufactured by Ciba Specialty Chemicals) as an antioxidant, 0.51 parts by weight of a diazo-based weathering stabilizer (trade name: Sumisorb 300, manufactured by Sumitomo Chemical Co., Ltd.) as a weathering stabilizer, 0.51 parts by weight of a HALS-based weathering stabilizer (trade name: Tinuvin 622, manufactured by Ciba Specialty Chemicals), 5.1 parts by weight of an organic peroxide (10% dilution of 2,5-dimethyl-2,5-di(t-butylperoxy)hexane (trade name: APO-10DL, manufactured by Kayaku Akzo Corporation) in paraffinic oil (trade name: PW-100, manufactured by Idemitsu Kosan Co., Ltd.)), and 0.25 parts by weight of a crosslinking assistant (trade name: Sumifine BM, manufactured by Sumitomo Chemical Co., Ltd.) were extruded via a twin-screw extruder at 200±10° C. (that is, under dynamic heating), to give an olefin thermoplastic elastomer composition. The content of cyclohexane-soluble(s) of the olefin thermoplastic elastomer composition was 7.7%.

The resulting thermoplastic elastomer composition was formed into an olefin thermoplastic elastomer molded article (A-2) of 15 cm×9 cm×thickness 2 mm by means of a 100-ton injection molding machine with a cylinder temperature set at 220° C. and a mold temperature at 50° C. The compression set of the molded article was 45%.

Production of Composite Molded Article

The molded article of olefin thermoplastic elastomer (A-2) was cut out into a plate molded article of 9 cm×3 cm×thickness 2 mm and charged into a mold of a 100-ton injection molding machine, and the olefin thermoplastic elastomer composition obtained in Example 3 was injected into the mold set at a mold temperature of 50° C. at a cylinder temperature of 250° C., followed by insert molding to give a composite molded article. The composite molded article was punched out with JIS No. 3 dumbbell and pulled at a pulling rate of 200 mm/min. for evaluation of its adhesion strength. The composite molded article was placed in an oven at 80° C. for 168 hours and observed for its interfacial stickiness. The results are shown in Table 2.

Example 4

Production of Molded Article of Olefin Thermoplastic Elastomer (A-3)

200 parts by weight of the oil extended ethylene/propylene/5-ethylidene-2-norbornene copolymer rubber (EPDM-2) as a rubber component, 59.7 parts by weight of the propylene homopolymer (PP-2) as propylene, 0.26 parts by weight of a phenol-based antioxidant (trade name: Irganox 1010, manufactured by Ciba Specialty Chemicals) as an antioxidant, 0.79 parts by weight of zinc oxide (trade name: "Zinc Oxide type 2", manufactured by Sakai Chemical Industry Co., Ltd.), and 6.2 parts by weight of a phenol resin (trade name: Tackiroll 250, Taoka Chemical Co., Ltd.) were extruded via a twin-screw extruder at 200±10° C. (that is, under dynamic heating), to give an olefin thermoplastic elastomer composition. The content of cyclohexane-soluble(s) of the olefin thermoplastic elastomer composition was 1.2%.

The resulting thermoplastic elastomer composition was formed into a molded article of an olefin thermoplastic elastomer (A-3) of 15 cm×9 cm×thickness 2 mm by means of a 100-ton injection molding machine with a cylinder temperature set at 220° C. and a mold temperature at 50° C. The compression set of the molded article was 29%.

Production of Composite Molded Article

The molded article of olefin thermoplastic elastomer (A-3) was cut out into a plate molded article of 9 cm×3 cm×thickness 2 mm and charged into a mold of a 100-ton injection molding machine, and the olefin thermoplastic elastomer composition obtained in Example 3 was injected into the mold set at a mold temperature of 50° C. at a cylinder temperature of 250° C., followed by insert molding to give a composite molded article. The composite molded article was punched out with JIS No. 3 dumbbell and pulled at a pulling rate of 200 mm/min. for evaluation of its adhesion strength. The composite molded article was placed in an oven at 80° C. for 168 hours and observed for its interfacial stickiness. The results are shown in Table 2.

Example 5

Production of Molded Article of Olefin Thermoplastic Elastomer (A-4)

200 parts by weight of the oil extended ethylene/propylene/5-ethylidene-2-norbornene copolymer rubber (EPDM-2) as a rubber component, 59.7 parts by weight of the propylene homopolymer PP-2) as propylene, 0.26 parts by weight of a phenol-based antioxidant (trade name: Irganox 1010, manufactured by Ciba Specialty Chemicals) as an antioxidant, 0.77 parts by weight of zinc oxide (trade name: "Zinc Oxide type 2", manufactured by Sakai Chemical Industry Co., Ltd.), 6.2 parts by weight of a phenol resin (trade name: Tackiroll 201, Taoka Chemical Co., Ltd.), and 1.56 parts by weight of stannous chloride (special grade reagent manufactured by Kanto Chemical Co., Ltd.) were extruded via a twin-screw extruder at 200±10° C. (that is, under dynamic heating), to give an olefin thermoplastic elastomer composition. The content of cyclohexane-soluble(s) of the olefin thermoplastic elastomer composition was 2.0%.

The resulting thermoplastic elastomer composition was formed into molded article of an olefin thermoplastic elastomer (A-4) of 15 cm×9 cm×thickness 2 mm by means of a 100-ton injection molding machine with a cylinder temperature set at 220° C. and a mold temperature at 50° C. The compression set of the molded article was 28%.

Production of Composite Molded Article

The molded article of olefin thermoplastic elastomer (A-4) was cut out into a plate molded article of 9 cm×3 cm×thickness 2 mm and charged into a mold of a 100-ton injection molding machine, and the olefin thermoplastic elastomer composition obtained in Example 3 was injected into the mold set at a mold temperature of 50° C. at a cylinder temperature of 250° C., followed by insert molding to give a composite molded article. The composite molded article was punched out with JIS No. 3 dumbbell and pulled at a pulling rate of 200 mm/min. for evaluation of its adhesion strength. The composite molded article was placed in an oven at 80° C. for 168 hours and observed for its interfacial stickiness. The results are shown in Table 2.

TABLE 2

|  | Example 3 | Example 4 | Example 5 | Comparative Example 3 |
|---|---|---|---|---|
| Molded article of olefin thermoplastic elastomer (A) | 121-73W175 | Molded article (A-3) | Molded article (A-4) | Molded article (A-2) |
| Formulation of polymers of olefin thermoplastic elastomer composition (B') | | | | |
| PP-1 (parts by weight) | 66.7 | 66.7 | 66.7 | 66.7 |
| EPDM-1 (parts by weight) | 200 | 200 | 200 | 200 |
| Adhesion strength (MPa) | 4.9 | 4.6 | 4.7 | 4.1 |
| State of adhesive interface | Not sticky | Not sticky | Not sticky | Not sticky |

Industrial Applicability

The composite molded article of the present invention is fused with sufficient strength. According to the method for producing a composite molded article of the present invention, there can be obtained a composite molded article fused with sufficient strength.

The invention claimed is:

1. A composite molded article comprising
a molded article of an olefinic thermoplastic elastomer (A) and
a molded article of an olefinic thermoplastic elastomer (B) fused to each other, wherein
the molded article of olefinic thermoplastic elastomer (A) contains an olefinic thermoplastic elastomer composition (A') having less than 5% by weight of a cyclohexane-soluble(s) and less than 35% of a compression set (JIS K6262, 70° C., 22 hours), and
the molded article of olefinic thermoplastic elastomer (B) contains an olefinic thermoplastic elastomer composition (B') obtained by blending
100 parts by weight of an ethylene/α-olefinic/non-conjugated diene copolymer rubber (b-1) containing 6 to 15 wt % of a non-conjugated diene unit, with
40 to 150 parts by weight of a mineral oil softener (b-2), 5 to 150 parts by weight of an olefin resin (b-3), and
0.01 to 20 parts by weight of a crosslinking agent (b-4) and subsequent dynamic heat treatment thereof,
wherein the olefinic thermoplastic elastomer composition (A') is produced by heat-treating, under kneading, an olefin resin and an ethylene/α-olefin copolymer rubber, with a crosslinking agent, and
the content of cyclohexane-soluble(s) refers to the percentage by weight of cyclohexane-soluble(s) derived from the starting material ethylene/α-olefin copolymer rubber in the olefinic thermoplastic elastomer composition (A'), assuming that the weight of the starting material ethylene/α-olefin copolymer rubber used in the production of the olefinic thermoplastic elastomer composition (A') is 100% by weight.

2. The composite molded article according to claim 1, wherein the composite molded article is an automobile interior or exterior material.

3. The composite molded article according to claim 1, wherein the composite molded article is a weather strip material.

4. The composite molded article according to claim 3, which comprises a rod-shaped member consisting of the olefin thermoplastic elastomer molded article (A) and a corner member consisting of the olefin thermoplastic elastomer molded article (B) fused to each other.

5. A method for producing the composite molded article of claim 1, which comprises charging the molded article of the olefin thermoplastic elastomer (A) into a mold, then injecting the olefin thermoplastic elastomer composition (B') into the die, and fusing the molded article of olefin thermoplastic elastomer (A) to the molded article of the olefin thermoplastic elastomer (B).

* * * * *